(12) United States Patent
Feinauer et al.

(10) Patent No.: US 10,804,817 B2
(45) Date of Patent: Oct. 13, 2020

(54) PWM CONTROL FOR ELECTROMAGNETIC VALVES

(71) Applicant: Buerkert Werke GmbH & Co. KG, Ingelfingen (DE)

(72) Inventors: Markus Feinauer, Ingelfingen (DE); Simon Kastner, Ingelfingen (DE); Dinko Begovic, Ingelfingen (DE); Sebastian Frank, Ingelfingen (DE)

(73) Assignee: Buerkert Werke GmbH & Co. KG (DE)

( * ) Notice: Subject to any disclaimer, the term of this patent is extended or adjusted under 35 U.S.C. 154(b) by 0 days.

(21) Appl. No.: 16/433,375

(22) Filed: Jun. 6, 2019

(65) Prior Publication Data
US 2019/0376612 A1   Dec. 12, 2019

(30) Foreign Application Priority Data
Jun. 11, 2018 (DE) .................. 10 2018 113 860

(51) Int. Cl.
*H02M 7/5395* (2006.01)
*F16K 31/06* (2006.01)
*F16H 61/02* (2006.01)
*G05D 16/20* (2006.01)

(52) U.S. Cl.
CPC ....... *H02M 7/5395* (2013.01); *F16K 31/0675* (2013.01); *F16H 2061/0255* (2013.01); *G05D 16/2013* (2013.01)

(58) Field of Classification Search
CPC ..... H02P 6/22; H02P 6/28; B60T 8/36; B60T 8/366
See application file for complete search history.

(56) References Cited

U.S. PATENT DOCUMENTS

| | | | | |
|---|---|---|---|---|
| 6,493,204 B1* | 12/2002 | Glidden | .................... | B60T 8/36 361/154 |
| 7,558,043 B2* | 7/2009 | Magyar | .................... | B41F 7/30 361/152 |
| 8,018,184 B2* | 9/2011 | Takeuchi | .................. | H02P 6/28 318/400.04 |
| 8,072,166 B2* | 12/2011 | Takeuchi | ............... | H02K 21/16 310/179 |

* cited by examiner

*Primary Examiner* — Rina I Duda
(74) *Attorney, Agent, or Firm* — Carlson, Gaskey & Olds, P.C.

(57) ABSTRACT

A circuit and a method of controlling a circuit is provided for an electronic control of an electromagnetic drive of an electromagnetic valve. The circuit provides a control signal for the electromagnetic drive which has a high level and a low level. The control signal comprises at least a first time interval having a first duty cycle, an optional second time interval having a second duty cycle, and a third time interval having a third duty cycle, the first, second and third duty cycles being less than one. The first duty cycle is greater than the second duty cycle and the second duty cycle is greater than the third duty cycle. The time length of the time intervals and the size of the duty cycles are configured such that the electromagnetic drive changes from a first operating state to a second operating state in the first time interval, optionally remains in the second operating state in the second time interval, and changes from the second operating state to the first operating state in the third time interval.

12 Claims, 3 Drawing Sheets

PWM CONTROL FOR ELECTROMAGNETIC VALVES

CROSS-REFERENCE TO RELATED APPLICATIONS

This application is a U.S. non-provisional application claiming the benefit of German Patent Application No. 10 2018 113 860.1, filed on Jun. 11, 2018, which is incorporated herein by its entirety.

FIELD OF INVENTION

The invention relates to a circuit and to a method for the control of an electromagnetic drive of an electromagnetic valve, in particular for the control by a pulse-width modulated (PWM) signal.

BACKGROUND OF THE INVENTION

Electromagnetic valves having an electromagnetic drive are used in a wide variety of applications. For example, there are pilot magnet valves that are used in control heads and provide a certain pressure on the inlet side of a main valve. Pilot magnet valves can, for example, control the air required to open and close a process valve. The electromagnetic drive of electromagnetic valves typically comprises an armature and a coil which is, for example, controlled by a pulse-width modulated control signal.

SUMMARY OF THE INVENTION

A control of electromagnetic valves having electromagnetic drives, is improved in terms of power consumption and complexity.

According to one aspect, a circuit is provided for the electronic control of an electromagnetic drive of an electromagnetic valve (also electromagnetic valve). The circuit is arranged to provide a control signal for the electromagnetic drive which has a high level (ON level) and a low level (OFF level), or alternates between the high level and the low level. The control signal comprises at least a first time interval having a first duty cycle, an optional second time interval having a second duty cycle, and a third time interval having a third duty cycle.

In the present context, the duty cycle is the ratio of the ON time (duration or period of time during which the signal is at the high level) to the sum of OFF time (duration or period of time during which the signal is at the low level) and ON time. The sum of the ON time and OFF time can correspond to the period or also to the fundamental frequency of the control signal, as is for example usual for PWM signals. The first time interval, optionally the second time interval, and the third time interval advantageously follow each other in time, particularly advantageously immediately follow each other. Furthermore, the first, second, and third duty cycles are less than one. In other words, the signal changes from high level to low level at least once within the time intervals or remains completely zero. The first duty cycle is greater than the second duty cycle, and the second duty cycle is greater than the third duty cycle. The duration of the time intervals and the size of the duty cycles are advantageously configured such that the electromagnetic drive changes from a first operating state to a second operating state in the first time interval, remains in the second operating state in the optional second time interval, and changes from the second operating state to the first operating state in the third time interval. According to the above aspects, numerous advantages can be achieved. First, the level of a power supply can be adjusted in the form of an average or time-averaged level for the electromagnetic drive by selecting the duty cycle. The energy consumption or the power consumption of the electromagnetic drive can be reduced if the electromagnetic drive is in the second operating state, and the electromagnetic valve can change in a purposeful manner between the first and the second operating state without having to set further intermediate states between the operating states.

The control signal can advantageously be an interconnection of PWM signals, particularly advantageously an interconnection of two PWM signals. The interconnection can advantageously be a logical AND operation. Accordingly, the control signal can include a first and a second signal component. The first and the second signal components can each be provided by a first PWM signal and a second PWM signal, which are combined accordingly.

The first PWM signal may have a first fundamental frequency, and the second PWM signal may have a second fundamental frequency. The first fundamental frequency can advantageously be greater than the second fundamental frequency. The first fundamental frequency and the first duty cycle can advantageously be so large that the electromagnetic drive can change from the first operating state to the second operating state. The first fundamental frequency and the second duty cycle can advantageously be so large that the electromagnetic drive can remain in the second operating state.

The first fundamental frequency can, for example, also be a positive integral multiple of the second fundamental frequency.

Irrespective of the ratio of the first fundamental frequency to the second fundamental frequency, the second PWM signal may also be arranged such that at least the OFF time(s) of the second PWM signal is (are) longer than the OFF time(s) of the first PWM signal. Advantageously, both the ON time(s) and the OFF time(s) of the second PWM signal can be longer than the ON time(s) and OFF time(s) of the first PWM signal.

The first PWM signal may be arranged to provide the first time interval having the first duty cycle and to provide the optional second time interval having the second duty cycle. The second PWM signal can be arranged to provide the third time interval having the third duty cycle. The second PWM signal can be the manipulated variable for the electromagnetic valve.

The second PWM signal can be arranged such that the electromagnetic valve is always fully open and fully closed, thereby setting a determined, time-averaged desired position of the electromagnetic valve.

Advantageously, the third duty cycle can be zero. Advantageously, the second time interval can be mandatory, i.e. not optional.

The circuit may be arranged to interconnect the first PWM signal and the second PWM signal according to or via a logical interconnection, in particular a logical operation, and in particular a logical AND operation, and to combine them to a single control signal or to the control signal. In accordance with the principle of the AND operation, the level of the control signal for the electromagnetic drive is deemed to be at the high level (ON level) only if both the first PWM signal and the second PWM signal are simultaneously at a high level.

In one configuration, the circuit can accordingly include one AND gate or one circuit or a plurality of gates having an equivalent functionality. The AND gate or the equivalent circuit can then receive the first and the second PWM signals and logically interconnect them by an AND operation.

The circuit can furthermore also comprise a transistor which is coupled to the electromagnetic drive. The output of the AND gate or of the equivalent circuit can then, for example, be issued to the transistor which is coupled to the electromagnetic drive such that the electromagnetic drive is controlled by the output signal or the control signal via the transistor.

The circuit can comprise a microcontroller. The first PWM signal or also the second PWM signal can be provided by the microcontroller. The first or also the second PWM signal can also be provided by a discrete circuit.

The circuit may be configured to detect a supply voltage level of a supply voltage for the electromagnetic drive. In particular, the circuit can be configured to adjust one, several, or all duty cycles of the control signal in response to this supply voltage level. For this purpose, the circuit can, for example, comprise an A/D converter which is coupled to the power supply for detecting a supply voltage level and accordingly outputs digital data to the microcontroller in order to adapt one or more duty cycles, in particular the first and/or the second duty cycle.

The circuit can be located in a position regulator or a positioner.

The positioner or position regulator can be located on or in the electromagnetic valve.

A method of controlling an electromagnetic drive for an electromagnetic valve is also provided. Accordingly, a control signal for operating the electromagnetic drive is provided, the control signal comprising a first time interval, an optional second time interval and a third time interval which follow each other in time and advantageously immediately follow each other. The first time interval has a first duty cycle, the second time interval has a second duty cycle, and the third time interval has a third duty cycle, the duty cycle in the first, second and third time intervals being less than one, and the first duty cycle being greater than the second duty cycle, and the second duty cycle being greater than the third duty cycle.

The first time interval and the first duty cycle can be set such that the electromagnetic drive changes from a first operating state to a second operating state. The optional second time interval and the second duty cycle can be set such that the electromagnetic drive or the electromagnetic valve remains in the second operating state. The third time interval and the third duty cycle can be set such that the electromagnetic drive or the electromagnetic valve changes from the second operating state to the first operating state.

The third duty cycle can be zero. In other words, in the third interval, the control signal can be and remain switched off or continuously have a low level.

The first operating state of the electromagnetic drive can be the closed operating state of the electromagnetic valve, and the second operating state can be the open operating state of the electromagnetic valve. In a different configuration, this can also apply the other way round. However, the first and the second operating state advantageously relate to a complete opening or a complete closing of the valve.

According to a further aspect, a supply voltage level of the electromagnetic drive can be detected, and the first duty cycle and/or the second duty cycle can be set on the basis of the detected supply voltage level. This ensures that the required time-averaged voltage is always applied to the electromagnetic drive.

BRIEF DESCRIPTION OF THE DRAWINGS

Further advantageous aspects and features of the invention are illustrated by the following description of example embodiments with reference to the enclosed figures which show.

DETAILED DESCRIPTION

Figure 1:
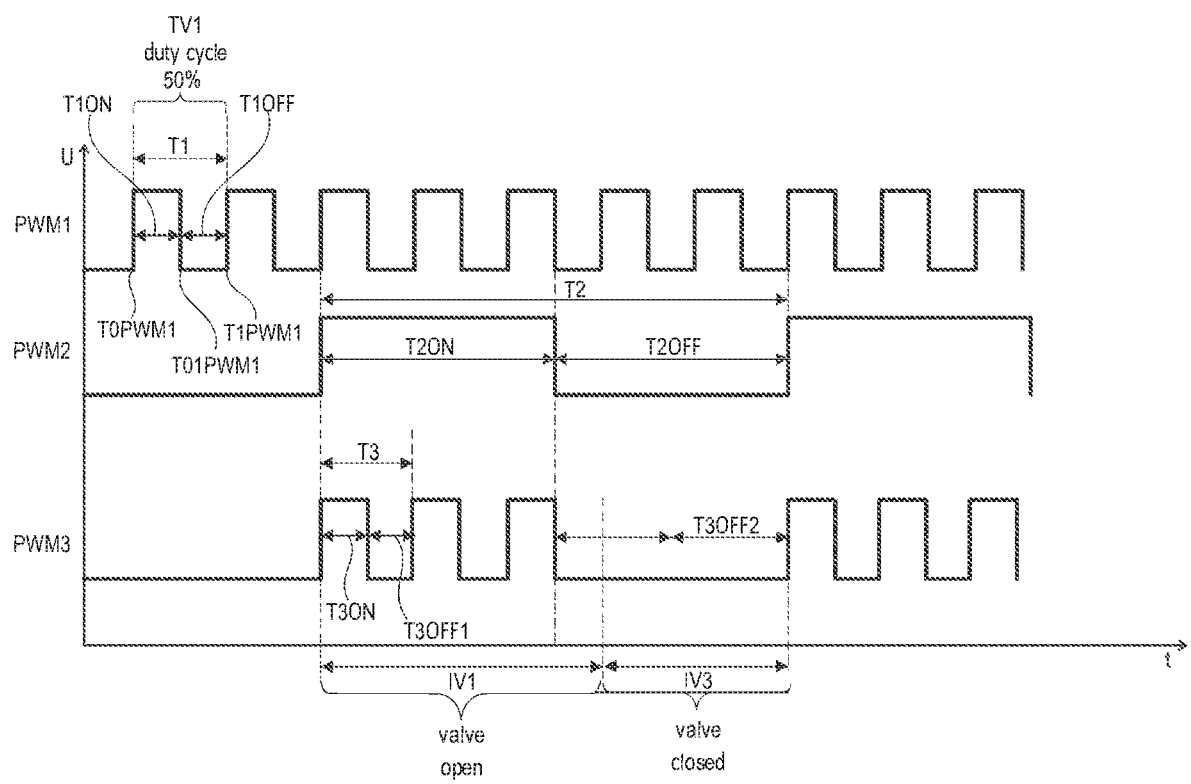
FIG. 1 is a simplified schematic voltage-time diagram with three PWM signals.

FIG. 1 shows a simplified schematic voltage-time diagram with a first, a second and a third PWM signal (PWM signal) PWM1, PWM2, PWM3. The third PWM signal PWM3 serves as a control signal for controlling an electromagnetic drive of an electromagnetic valve in a first embodiment. The electromagnetic drive comprises a magnet coil which is operated on the basis of the control signal. The first PWM signal PWM1 serves as an operating variable with a supply voltage adjustment, and the second PWM signal PWM2 as the manipulated variable for the electromagnetic drive. The third PWM signal PWM3 is a combination of the first PWM signal PWM1 and the second PWM signal PWM2, created according to the principle of the AND operation. Here, the level of the third PWM signal PWM3 or the level of the control signal for the electromagnetic drive is deemed to be at the high level (ON level) only if both the first PWM signal PWM1 and the second PWM signal PWM2 are simultaneously at a high level. The control signal or the third PWM signal PWM3 includes all advantageous properties of the first and the second PWM signals PWM1 and PWM2.

In the voltage-time diagram, the time is plotted on the abscissa and the voltage on the ordinate. The upper signal is a first PWM signal PWM1. The period of time between the times T0PWM1 and T1PWM1 is the period duration T1 of the first PWM signal PWM1. The period duration T1 comprises a complete cycle, i.e. the sum of ON time and OFF time. The reciprocal of the period duration T1 is the fundamental frequency F1. The ON time T1ON corresponds to the period of time between the times T0PWM1 and T01PWM1, and the OFF time T1OFF corresponds to the period of time between the times T01PWM1 and T1PWM1. During the ON time T1ON, the PWM signal PWM1 is high, i.e. the amplitude or level is high (High). During the OFF time T1OFF, the PWM signal PWM1 is low, i.e. the amplitude or level is low (Low). The ratio of the ON time T1ON to the period duration T1 corresponds to the first duty cycle TV1. According to the present embodiment, TV1 is for example 50% in the case of the first PWM signal PWM1. The first PWM signal PWM1 ensures an adequate time-averaged supply voltage for the magnet coil.

The supply voltage for the magnet coil can both vary due to the nominal supply voltage of a power supply unit and can also be subject to fluctuations during operation of the electromagnetic valve. Via the first duty cycle TV1, the voltage of a supply voltage source can be adapted to the required voltage across the magnet coil. An initial input voltage of 24 V can for example be reduced to an effective (time-averaged) input voltage of 12 V applied to the magnet coil using the 50% duty cycle. Due to the reduced effective voltage Ueff across the magnet coil, the current through the coil decreases. The reduction of the effectively applied voltage Ueff and the associated reduction of the applied current intensity lead in particular to a reduction of the electrical power to be applied to operate the coil (reduction of the power dissipation). The first duty cycle TV1 is always less than one and thus has a finite OFF time T1OFF.

The reciprocal of the period duration T1 results in a first fundamental frequency F1 of the first PWM signal PWM1. The first duty cycle TV1 is selected such that sufficient power is provided for a change from a first operating state to a second operating state of the electromagnetic drive. In the present case, this is the change in position of an armature of the electromagnetic drive from a not-attracted position to an attracted position. If the armature is in the attracted position, a process fluid flow (air flow) can for example be provided. The electromagnetic valve can be in the open operating state. The electromagnetic drive is then in the second operating state.

The second PWM signal PWM2 represents the manipulated variable for the electromagnetic drive. The manipulated variable determines the position of the armature and thus whether a process fluid flow (air flow) is provided. The second PWM signal PWM2 can generally have a longer period duration T2 than the first PWM signal PWM1 and thus have a lower fundamental frequency F2 than the first PWM signal PWM1.

Irrespective of the ratio of the fundamental frequencies F1 and F2, the second PWM signal PWM2 can also be defined such that at least the OFF time(s) of the second PWM signal PWM2 is (are) longer than the OFF times of the first PWM signal PWM1. Furthermore, both the ON time(s) T2ON and the OFF time(s) T2OFF can advantageously be longer than the ON time(s) and OFF time(s) of the first PWM signal PWM1. The second fundamental frequency F2 and a duty cycle of the second PWM signal PWM2 or the ON time T2ON and the OFF time T2OFF are selected such that on the one hand, the armature can change from the not-attracted position to the attracted position during the ON time T2ON and, if necessary, remains in the attracted position, and, on the other hand, changes back to the not-attracted position during a sufficiently long OFF time T2OFF. In the non-attracted position of the armature, the electromagnetic valve is in the closed operating state. The electromagnetic drive is in the first operating state. As a result of the necessary longer OFF time T2OFF of the second PWM signal PWM2 for the change of the armature to the not-attracted position, the second fundamental frequency F2 can be lower than the first fundamental frequency F1 of the first PWM signal PWM1. The duty cycle of the second PWM signal PWM2 can always be less than one. The OFF time T2OFF is generally selected such that the electromagnetic valve can change from the second operating state (e.g. open) to the first operating state (closed). In addition, the ON time T2ON is selected such that the electromagnetic valve can change from the first operating state (e.g. closed) to the second operating state (e.g. open) and, if necessary, can also remain in this second operating state.

The third PWM signal PWM3 is the control signal for the electromagnetic drive and is formed from a combination of a logical AND operation of the first PWM signal PWM1 as the first signal component S1 and the second PWM signal PWM2 as the second signal component S2. The third PWM signal PWM3 comprises at least two relevant time intervals, which for consistency reasons are referred to as first time interval IV1 and third time interval IV3. Accordingly, the first time interval IV1 has a first duty cycle TV1 and the third time interval IV3 has a third duty cycle TV3.

The third PWM signal PWM3 has a third fundamental frequency F3 which corresponds to the first fundamental frequency F1. In the third PWM signal PWM3, the duty cycle may change with time.

In the first time interval IV1, the duty cycle corresponds to the first duty cycle TV1. In the third time interval IV3, there is no ON time and the third duty cycle TV3 has the value zero. The duration of the third time interval IV3 corresponds to or is determined by the OFF time T2OFF of the second PWM signal PWM2.

During the ON time T3ON of the third PWM signal PWM3, the magnet coil is supplied with a voltage, whereas during the OFF times T3OFF1, T3OFF2, no voltage is applied to the magnet coil.

In the first time interval IV1, the electromagnetic drive changes from the first to the second operating state and remains in the second operating state. Therefore, a process fluid flow (air flow) is for example provided, and the electromagnetic valve is in the open operating state. In the third time interval IV3, the electromagnetic drive changes from the second operating state to the first operating state and remains in the first operating state. The electromagnetic valve is thus closed. The OFF time T3OFF2 of the third PWM signal PWM3 is long enough to ensure that the electromagnetic drive can change from the second to the first operating state.

Figure 2:
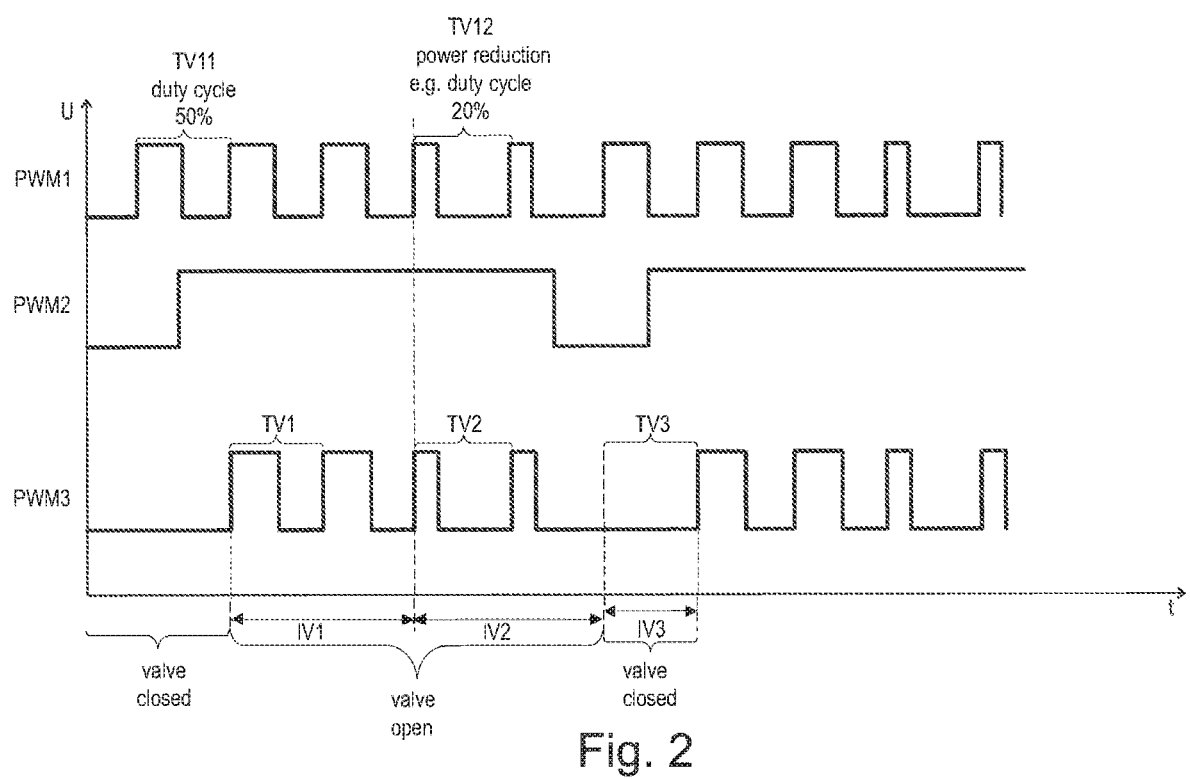
FIG. 2 is a simplified schematic voltage-time diagram with three PWM signals with duty cycles of individual signals at different times.

FIG. 2 shows a simplified schematic voltage-time diagram with a first, a second and a third PWM signal PWM1, PWM2, PWM3 in a second embodiment.

In the first PWM signal PWM1, the duty cycle changes in the course of the signal from an initial first duty cycle TV11 of, for example, 50% to a changed duty cycle TV12 of 20%. By reducing the duty cycle in the signal course, the effective (time-averaged) voltage applied across the magnet coil is reduced, which is why the current through the coil drops. The power dissipation can thus be reduced. After changing the armature from the not-attracted position to the attracted position, the duty cycle is reduced such that the power is sufficient to hold the armature in the attracted position. This corresponds to the second operating state of the electromagnetic drive, in which the electromagnetic valve is in the open operating state. To keep the armature in the attracted position, less power is required than to move it from the not-attracted to the attracted position.

Here, the third PWM signal PWM3 also represents the control signal and, with the additional power reduction in the signal course, comprises three time intervals, namely a first time interval IV1 having a first duty cycle TV1, a second time interval IV2 having a second duty cycle TV2, and a third time interval IV3 having a third duty cycle TV3.

The control signal or the third PWM signal PWM3 has a third fundamental frequency F3 which corresponds to the first fundamental frequency F1. The first, second and third duty cycles of the PWM signal PWM3 assume three values TV1, TV2 and TV3. In the first time interval IV1, the first duty cycle TV1 of the PWM signal PWM3 corresponds to the initial duty cycle TV11 of the first PWM signal PWM1 before power reduction. The fundamental frequency F3 and the duty cycle TV1 are high enough to move the armature from the first position to the second position. Therefore, the electromagnetic drive changes from the first to the second operating state and remains in the second operating state. The electromagnetic valve is opened.

In the second time interval IV2, the second duty cycle TV2 of the PWM signal PWM3 corresponds to the reduced duty cycle TV12 of the first PWM signal PWM1 after the power reduction. The fundamental frequency F3 and the second duty cycle TV2 are high enough to keep the armature in the second or attracted position. The electromagnetic drive thus remains in the second operating state. The electromagnetic valve remains open.

The third time interval IV3 has no ON time and therefore has a duty cycle of zero. In the third time interval IV3, the electromagnetic drive changes back from the second to the first operating state. The electromagnetic valve closes. The duty cycle decreases from the first to the third time interval (TV1>TV2>TV3) and is always less than one (TV1, TV2, TV3<1).

Figure 3:
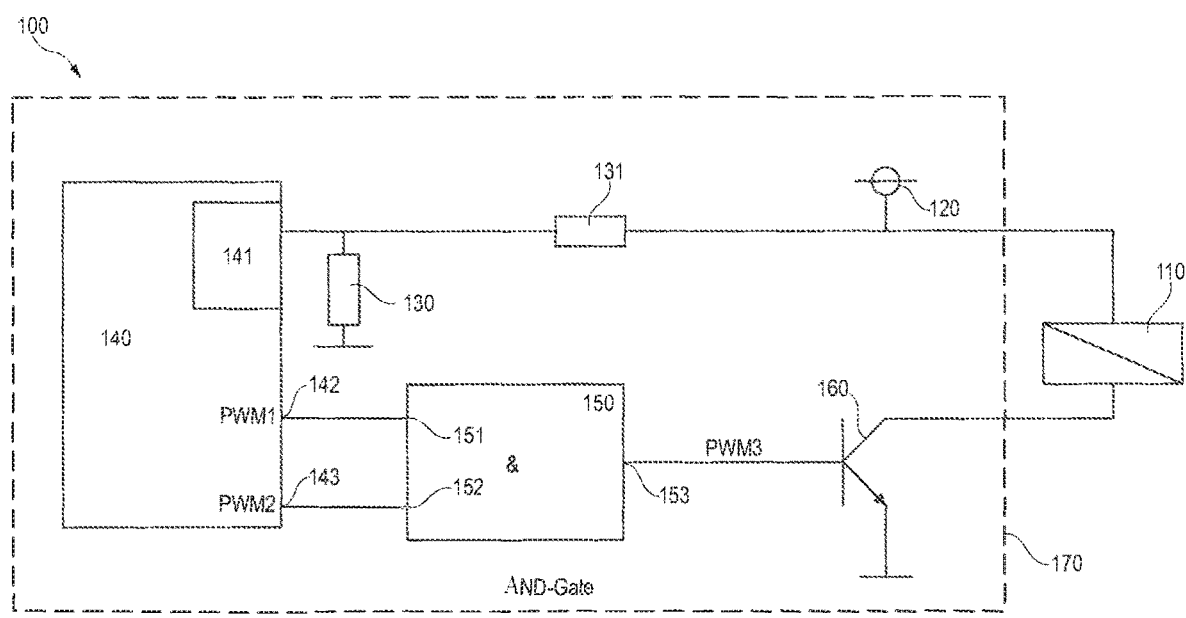
FIG. 3 is a simplified schematic circuit diagram of a circuit for the provision of a control signal for an electromagnetic drive of an electromagnetic valve.

FIG. 3 shows a simplified schematic circuit diagram of an electronic circuitry or circuit 100 for an electromagnetic drive of an electromagnetic valve (not shown). For the sake of simplicity, only the magnet coil 110 of an electromagnetic drive of a valve is shown. The circuit is located in the position regulator or positioner 170. The position regulator 170 can be accommodated in a housing along with one or more electromagnetic valves. The position regulator can be mounted laterally on the electromagnetic drive or can be placed thereon. Depending on the current applied, the magnet coil 110 moves the armature (not shown) to open and close the electromagnetic valve. The magnet coil 110 is coupled to a supply voltage source 120. To determine the voltage VS of the supply voltage source 120, the latter is coupled via a voltage divider 131, 130 to an electronic signal processing unit 140, e.g. a microcontroller. The actual value VS of the supply voltage is supplied as an analog signal to the signal processing unit 140, for example also a discrete circuit or a microcontroller, and is for example converted to a digital signal in an integrated analog-to-digital converter 141. The signal processing unit or the microcontroller 140 provides the first PWM signal PWM1 at a first output 142 on the basis of the measured actual value of the voltage VS. Based on the measured voltage VS, the signal processing unit or the microcontroller 140 determines the first duty cycle TV1 of the first PWM signal PWM1 and/or the second duty cycle TV2 of the first PWM signal PWM1 for an effective voltage level to be applied to the magnet coil 110. The signal processing unit or the microcontroller 140 also provides the second PWM signal PWM2 at a second output 143. The second PWM signal PWM2 constitutes the manipulated variable for the electromagnetic drive. The second PWM signal PWM2 can be determined on the basis of an external signal which is provided to the signal processing unit or the microcontroller 140 from the outside.

In one configuration, the first and/or second PWM signal PWM1, PWM2 can also be provided by discrete circuits.

The two outputs 142,142 of the signal processing unit or the microcontroller 140 are connected to a first and a second input 151,152 of an AND gate 150. The AND gate 150 can for example be an integrated circuit. In the AND gate 150, the first PWM signal PWM1 and the second PWM signal PWM2 are linked via a logical AND. The output 153 of the AND gate 150 provides a third PWM signal PWM3. The third PWM signal PWM3 is the control signal for the electromagnetic drive of the valve or for the magnet coil 110 of the electromagnetic drive. The output 153 of the AND gate 150 is coupled to a transistor 160 or connected to a transistor 160. The transistor 160 is coupled to the magnet coil 110. In the present case, the channel of the transistor is coupled between the magnet coil and ground. If the transistor is switched on, current can flow through the magnet coil 110, and the electric drive of the electromagnetic valve can change the operating state. In the present example, the transistor 160 is an NPN bipolar transistor coupled to the coil via the collector and to ground via the emitter. Of course, other transistor types can also be considered. The transistor 160 is switched on and off by the third PWM signal PWM3, as a result of which the current flow through the magnet coil 110 is controlled. This ensures that the magnet coil 110 is advantageously controlled by the control signal or the PWM signal PWM3 with regard to the current level of the supply voltage, power reduction and position of the valve.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A circuit for the electronic control of an electromagnetic drive of an electromagnetic valve, the circuit comprising:
   a signal processing unit, the circuit being arranged to provide a control signal for the electromagnetic drive which has a high level and a low level, wherein the circuit is arranged to provide the control signal in accordance with a logical AND operation of a first pulse-width modulated signal and a second pulse-width modulated signal, wherein the signal processing unit comprises a first discrete circuit arranged to provide the first pulse-width modulated signal, the control signal comprising at least a first time interval having a first duty cycle, an optional second time interval having a second duty cycle, and a third time interval having a third duty cycle, the first, second and third duty cycles being less than one, and the first duty cycle being greater than the second duty cycle, and the second duty cycle being greater than the third duty cycle, and a time length of the first, second, and third time intervals and the size of the first, second, and third duty cycles being configured such that the electromagnetic drive changes from a first operating state to a second operating state in the first time interval, optionally remains in the second operating state in the second time interval, and changes from the second operating state to the first operating state in the third time interval, and wherein the circuit is arranged to detect a supply voltage level of a supply voltage for the electromagnetic drive and to set the first duty cycle of the control signal on a basis of a detected supply voltage level.

2. The circuit according to claim 1, wherein the first pulse-width modulated signal is arranged to provide the first time interval having the first duty cycle and to provide the second time interval having the second duty cycle.

3. The circuit according to claim 1, wherein the second pulse-width modulated signal is arranged to provide the third time interval having the third duty cycle.

4. The circuit according to claim 1, wherein the circuit comprises an AND gate arranged to combine the first pulse-width modulated signal and the second pulse-width modulated signal to the control signal in accordance with a logical AND operation.

5. The circuit according to claim 4, wherein the circuit comprises a transistor coupled to the electromagnetic drive and receiving the control signal from the AND gate to control the electromagnetic drive via the control signal.

6. The circuit according to claim 1, wherein the signal processing unit comprises a microcontroller.

7. The circuit according to claim 6, wherein the signal processing unit comprises a second discrete circuit arranged to provide the second pulse-width modulated signal.

8. The circuit according to claim 7, wherein the circuit is arranged to set several or all of the first, second, and third duty cycles of the control signal on a basis of a detected supply voltage level.

9. A method of controlling an electromagnetic drive for an electromagnetic valve comprising:

providing a control signal for operating the electromagnetic drive, wherein the control signal is provided in accordance with a logical AND operation of a first pulse-width modulated signal and a second pulse-width modulated signal, wherein the first pulse-width modulated signal is provided by a signal processing unit comprising a first discrete circuit, the control signal comprising a first time interval, an optional second time interval, and a third time interval which immediately follow each other in time, the first time interval having a first duty cycle, the optional second time interval having a second duty cycle, and the third time interval having a third duty cycle, each duty cycle in the first, second and third time intervals being less than one, and the first duty cycle being greater than the second duty cycle, and the second duty cycle being greater than the third duty cycle;

setting the first time interval and the first duty cycle such that the electromagnetic drive changes from a first operating state to a second operating state;

optionally setting the second time interval and the second duty cycle such that the electromagnetic drive remains in the second operating state;

setting the third time interval and the third duty cycle such that the electromagnetic drive changes from the second operating state to the first operating state; and detecting a supply voltage level of the electromagnetic drive and setting the first duty cycle on the basis of a detected supply voltage level.

10. The method according to claim 9, wherein the third time interval has a duty cycle of zero.

11. The method according to claim 9, wherein the first operating state of the electromagnetic drive is a closed operating state of the electromagnetic valve and the second operating state is an open operating state of the electromagnetic valve.

12. The method according to claim 9, comprising: detecting a supply voltage level of the electromagnetic drive and setting the second duty cycle on the basis of a detected supply voltage level.

\* \* \* \* \*